United States Patent
Wallerstein et al.

(10) Patent No.: US 6,373,642 B1
(45) Date of Patent: Apr. 16, 2002

(54) PANORAMIC IMAGING ARRANGEMENT

(75) Inventors: Edward P. Wallerstein, Pleasanton; Edward C. Driscoll, Jr., Portola Valley; Willard C. Lomax, Sunnyvale; James E. Parris, Pacifica; John L. Furlani, Palo Alto; Edward V. Bacho, Sunnyvale; Jorge E. Carbo, Jr., Los Altos, all of CA (US)

(73) Assignee: Be Here Corporation, Cupertino, CA (US)

( * ) Notice: Subject to any disclaimer, the term of this patent is extended or adjusted under 35 U.S.C. 154(b) by 0 days.

(21) Appl. No.: 09/137,660

(22) Filed: Aug. 20, 1998

Related U.S. Application Data

(63) Continuation-in-part of application No. 08/872,525, filed on Jun. 11, 1997
(60) Provisional application No. 60/020,292, filed on Jun. 24, 1996.

(51) Int. Cl.[7] ............ G02B 13/06; G02B 17/00
(52) U.S. Cl. ............................ 359/725; 359/727
(58) Field of Search .................. 359/725, 726–727, 359/364, 458, 402–403, 618; 348/36, 38–39

(56) References Cited

U.S. PATENT DOCUMENTS

| | | | | |
|---|---|---|---|---|
| 2,146,662 A | | 2/1939 | Van Albada | 359/423 |
| 2,244,235 A | | 6/1941 | Ayres | 359/504 |
| 2,304,434 A | | 12/1942 | Ayres | 355/46 |
| 2,628,529 A | | 2/1953 | Braymer | 359/366 |
| 2,654,286 A | | 10/1953 | Cesar | 359/448 |
| 3,170,025 A | * | 2/1965 | Ino | 359/725 |
| 3,203,328 A | | 8/1965 | Brueggeman | 396/21 |

(List continued on next page.)

FOREIGN PATENT DOCUMENTS

| | | |
|---|---|---|
| FR | 1234341 | 5/1960 |
| GB | 2 221 118 A | 1/1990 |
| GB | 2289820 | 11/1995 |
| JP | 2-127877 | 11/1988 |

OTHER PUBLICATIONS

Deutsch, Claudia H., "One Camera That Offers Many View", The New York Times v146, Feb. 3, 1997, pages 2.
Spice, Bryon, "Panospheric Camera Expands Horizon", Pittsburgh Post–Gazette, Jun. 2, 1997, pages 3.
Heckbert, P., "Survey of Texture Mapping" IEEE CG&A, Nov. 1986, pp. 56–67.
Defendants, IPI's Notice of Reliance of Prior Art and Witnesses, Civil Action of Interactive Pictures Corporation, A/K/A Omniview, Inc. v. Infinite Pictures, Inc. and Bill Tillman, Case No. 3–96–849; 05 Pages. Filed: Dec. 8, 1997, in U.S.D.C., Eastern District of Tennessee.
Defendant IPI's Composit Exhibit List, Civil Action of interactive Pictures Corporation, F/K/A Omniview, Inc. v. Infinite Pictures, Inc. and Bill Tillman, Case No. 3–96–849. Filed: Jan. 5, 1998, in U.S.D.C., Eastern District of Tennessee. Pages: 20.
Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 8, 1997, in U.S.D.C., Eastern District of Tennessee.

(List continued on next page.)

*Primary Examiner*—Jordan M. Schwartz
(74) *Attorney, Agent, or Firm*—Daniel B. Curtis; Dag H. Johansen

(57) ABSTRACT

According to one aspect the invention, a panoramic imaging arrangement is provided which includes at least a first lens block including a convex reflective surface and a transparent component. The convex reflective surface has a substantially vertically extending axis of revolution and is capable of receiving light from a 360° surrounding panoramic scene, and reflecting the light for further manipulation. The transparent component covers the convex reflective surface. The convex reflective surface is thereby protected from environmental conditions which may otherwise result in damage to the convex reflective surface.

24 Claims, 2 Drawing Sheets

U.S. PATENT DOCUMENTS

| | | | |
|---|---|---|---|
| 3,205,777 A | 9/1965 | Benner | 248/480 |
| 3,229,576 A | 1/1966 | Rees | 359/364 |
| 3,692,934 A | 9/1972 | Herndon | 348/36 |
| 3,723,805 A | 3/1973 | Scarpino et al. | 315/370 |
| 3,785,715 A | 1/1974 | Mecklenborg | 359/631 |
| 3,832,046 A | 8/1974 | Mecklenborg | 352/69 |
| 3,846,809 A | 11/1974 | Pinzone et al. | 354/95 |
| 3,872,238 A | 3/1975 | Herndon | 178/6 |
| 3,934,259 A | 1/1976 | Krider | 354/94 |
| 3,998,532 A | 12/1976 | Dykes | 352/69 |
| 4,012,126 A | 3/1977 | Rosendahl et al. | 359/725 |
| 4,017,145 A | 4/1977 | Jerie | 359/220 |
| 4,038,670 A | 7/1977 | Seitz | 354/96 |
| 4,058,831 A | 11/1977 | Smith | 358/87 |
| 4,078,860 A | 3/1978 | Globus et al. | 352/69 |
| 4,157,218 A | 6/1979 | Gordon et al. | 354/66 |
| 4,190,866 A | 2/1980 | Lukner | 358/229 |
| 4,241,985 A | 12/1980 | Globus et al. | 354/99 |
| D263,716 S | 4/1982 | Globus et al. | D16/1 |
| 4,326,775 A | 4/1982 | King | 359/725 |
| 4,395,093 A | 7/1983 | Rosendahl et al. | 359/725 |
| 4,429,957 A | 2/1984 | King | 359/676 |
| 4,463,380 A | 7/1984 | Hooks, Jr. | 358/160 |
| 4,484,801 A | 11/1984 | Cox | 359/725 |
| 4,518,898 A | 5/1985 | Tarnowski et al. | 315/371 |
| 4,549,208 A | 10/1985 | Kamejima et al. | 358/108 |
| 4,561,733 A | 12/1985 | Kreischer | 359/856 |
| 4,566,763 A | 1/1986 | Greguss | 359/725 |
| 4,578,682 A | 3/1986 | Hooper et al. | 343/916 |
| 4,593,982 A | 6/1986 | Rosset | 354/99 |
| 4,602,857 A | 7/1986 | Woltz et al. | 352/84 |
| 4,656,506 A | 4/1987 | Ritchey | 358/87 |
| 4,661,855 A | 4/1987 | Gulck | 358/225 |
| 4,670,648 A | 6/1987 | Hall et al. | 250/216 |
| 4,728,839 A | 3/1988 | Coughlan et al. | 310/112 |
| 4,736,436 A | 4/1988 | Yasukawa et al. | 382/154 |
| 4,742,390 A | 5/1988 | Francke et al. | 358/108 |
| 4,751,660 A | 6/1988 | Hedley | 364/518 |
| 4,754,269 A | 6/1988 | Kishi et al. | 340/729 |
| 4,761,641 A | 8/1988 | Schreiber | 340/717 |
| 4,772,942 A | 9/1988 | Tuck | 358/87 |
| 4,797,942 A | 1/1989 | Burt et al. | 382/41 |
| 4,807,158 A | 2/1989 | Blanton et al. | 364/521 |
| 4,835,532 A | 5/1989 | Fant | 340/728 |
| 4,858,002 A | 8/1989 | Zobel | 358/98 |
| 4,858,149 A | 8/1989 | Quarendon | 364/522 |
| 4,864,335 A | 9/1989 | Corrales | 354/99 |
| 4,868,682 A | 9/1989 | Shimizu et al. | 358/335 |
| 4,899,293 A | 2/1990 | Dawson et al. | 364/521 |
| 4,901,140 A | 2/1990 | Lang et al. | 358/64 |
| 4,907,084 A | 3/1990 | Nagafusa | 358/171 |
| 4,908,874 A | 3/1990 | Gabriel | 382/41 |
| 4,918,473 A | 4/1990 | Blackshear | 354/81 |
| 4,924,094 A | 5/1990 | Moore | 250/334 |
| 4,943,821 A | 7/1990 | Gelphman et al. | 354/94 |
| 4,943,851 A | 7/1990 | Lang et al. | 358/87 |
| 4,945,367 A | 7/1990 | Blackshear | 354/81 |
| 4,965,844 A | 10/1990 | Oka et al. | 382/44 |
| D312,263 S | 11/1990 | Charles | D16/203 |
| 4,974,072 A | 11/1990 | Hasegawa | 358/80 |
| 4,985,762 A | 1/1991 | Smith | 358/87 |
| 4,991,020 A | 2/1991 | Zwirn | 358/160 |
| 5,005,083 A | 4/1991 | Grage et al. | 358/181 |
| 5,020,114 A | 5/1991 | Fujioka et al. | 382/44 |
| 5,021,813 A | 6/1991 | Corrales | 396/24 |
| 5,023,725 A | 6/1991 | McCutchen | 358/231 |
| 5,038,225 A | 8/1991 | Maeshima | 358/461 |
| 5,040,055 A | 8/1991 | Smith | 358/87 |
| 5,048,102 A | 9/1991 | Tararine | 382/41 |
| 5,067,019 A | 11/1991 | Juday et al. | 358/160 |
| 5,068,735 A | 11/1991 | Tuchiya et al. | 358/209 |
| 5,077,609 A | 12/1991 | Manephe | 358/109 |
| 5,083,389 A | 1/1992 | Alperin | 40/539 |
| 5,097,325 A | 3/1992 | Dill | 358/87 |
| 5,115,266 A | 5/1992 | Troje | 354/75 |
| 5,130,794 A | 7/1992 | Ritchey | 358/87 |
| 5,142,354 A | 8/1992 | Suzuki et al. | 358/34 |
| 5,153,716 A | 10/1992 | Smith | 358/87 |
| 5,157,491 A | 10/1992 | Kassatly | 358/146 |
| 5,166,878 A | 11/1992 | Poelstra | 364/424.01 |
| 5,173,948 A | 12/1992 | Blackham et al. | 382/44 |
| 5,175,808 A | 12/1992 | Sayre | 395/133 |
| 5,185,667 A | 2/1993 | Zimmerman | 358/209 |
| 5,187,571 A | 2/1993 | Braun et al. | 358/85 |
| 5,189,528 A | 2/1993 | Takashima et al. | 358/448 |
| 5,200,818 A | 4/1993 | Neta et al. | 358/87 |
| 5,231,673 A | 7/1993 | Elenga | 382/6 |
| 5,259,584 A | 11/1993 | Wainwright | 248/342 |
| 5,262,852 A | 11/1993 | Eouzan et al. | 358/87 |
| 5,262,867 A | 11/1993 | Kojima | 358/209 |
| 5,280,540 A | 1/1994 | Addeo et al. | 379/54 |
| 5,289,312 A | 2/1994 | Hashimoto et al. | 359/487 |
| 5,305,035 A | 4/1994 | Schonherr et al. | 354/96 |
| 5,311,572 A | 5/1994 | Freides et al. | 379/67 |
| 5,313,306 A | 5/1994 | Kuban et al. | 348/65 |
| 5,315,331 A | 5/1994 | Ohshita | 354/94 |
| 5,341,218 A | 8/1994 | Kaneko et al. | 348/695 |
| 5,359,363 A | 10/1994 | Kuban et al. | 348/36 |
| 5,384,588 A | 1/1995 | Martin et al. | 348/15 |
| 5,396,583 A | 3/1995 | Chen et al. | 395/127 |
| 5,422,987 A | 6/1995 | Yamada | 395/127 |
| 5,432,871 A | 7/1995 | Novik | 382/232 |
| 5,444,476 A | 8/1995 | Conway | 348/15 |
| 5,446,833 A | 8/1995 | Miller et al. | 395/125 |
| 5,452,450 A | 9/1995 | Delory | 395/600 |
| 5,473,474 A | 12/1995 | Powell | 359/725 |
| 5,479,203 A | 12/1995 | Kawai et al. | 348/15 |
| 5,490,239 A | 2/1996 | Myers | 395/129 |
| 5,495,576 A | 2/1996 | Ritchey | 395/125 |
| 5,508,734 A | 4/1996 | Baker et al. | 348/36 |
| 5,530,650 A | 6/1996 | Bifero et al. | 364/460 |
| 5,539,483 A | 7/1996 | Nalwa | 353/94 |
| 5,550,646 A | 8/1996 | Hassen et al. | 358/442 |
| 5,563,650 A | 10/1996 | Poelstra | 348/36 |
| 5,601,353 A | 2/1997 | Naimark et al. | 353/122 |
| 5,606,365 A | 2/1997 | Maurinus et al. | 348/222 |
| 5,610,391 A | 3/1997 | Ringlien | 250/223 B |
| 5,612,533 A | 3/1997 | Judd et al. | 250/208.1 |
| 5,627,675 A | 5/1997 | Davis et al. | 359/366 |
| 5,631,778 A | 5/1997 | Powell | 359/724 |
| 5,633,924 A | 5/1997 | Kaish et al. | 379/266 |
| 5,649,032 A | 7/1997 | Burt et al. | 382/284 |
| 5,682,511 A | 10/1997 | Sposato et a l. | 395/353 |
| 5,686,957 A | 11/1997 | Baker et al. | 348/36 |
| 5,714,997 A | 2/1998 | Anderson et al. | 348/39 |
| 5,729,471 A | 3/1998 | Jain et al. | 364/514 A |
| 5,748,194 A | 5/1998 | Chen | 345/427 |
| 5,760,826 A | 6/1998 | Nayer | 348/36 |
| 5,761,416 A | 6/1998 | Mandet et al. | 395/200.8 |
| 5,764,276 A | 6/1998 | Martin et al. | 348/13 |
| 5,796,426 A | 8/1998 | Gullichsen et al. | 348/207 |
| 5,841,589 A | 11/1998 | Davis et al. | 359/726 |
| 5,844,520 A | 12/1998 | Guppy et al. | 342/177 |
| 5,850,352 A | 12/1998 | Moezzi et al. | 364/514 A |
| 5,854,713 A | 12/1998 | Kuroda et al. | 359/850 |
| 5,877,801 A | 3/1999 | Martin et al. | 348/36 |
| RE36,207 E | 5/1999 | Zimmerman et al. | 348/207 |
| 5,903,319 A | 5/1999 | Busko et al. | 348/607 |
| 5,920,337 A | 7/1999 | Glassman et al. | 348/36 |
| 5,990,941 A | 11/1999 | Jackson et al. | 348/207 |
| 6,002,430 A | 12/1999 | McCall et al. | 348/207 |

| | | |
|---|---|---|
| 6,034,716 A | 3/2000 | Whiting et al. ............... 348/36 |
| 6,043,837 A | 3/2000 | Driscoll, Jr. et al. .......... 348/36 |

OTHER PUBLICATIONS

Plaintiff's Supplemental Trial Exhibit List, Civil Action of Interactive Pictures Corporation, F/K/A Omniview, Inc. v. Infinite Pictures, Inc. and Bill Tillman, Case No. 3–96–849; 41 Pages. Filed: Jan. 2, 1998; in U.S.D.C., Eastern District of Tennessee.

Ripley G. David, "DVI–A Digital Multimedia Technology". Communication of the ACM. Jul. 1989. vol. 32. No. 07. pp.: 811–820.

Cnoe M. and Kuno Y., "Digital Processing CF Images Taken By Fish–Eye Lens". 1982. IEEE. pp.: 105–108.

Hamit, F., "Near–Fisheye CCD Camera Broadens View for Imaging". Advanced Imaging. Mar. 1993. pp.: 50–52.

Dixon, D., Golin, S., and Hasfield, I., "DVI Video/Graphics". Computer Graphics World reprinted from the Jul. 1987 edition of Computer Graphics World. Pages: 04.

Upstill, Steve. "Building Stronger Images". UNIX Review. Oct. 1988, vol. 06. No. 10. pp.: 63–73.

Greene, N., "Environmental Mapping and Other Applications of the World Projections." Computer Graphics and Applications. Nov. 1986. IEEE Computer Society. vol. 06. No. 11. pp.: 21–29.

Hechbert P., "The PMAT and Poly User's Manual". Computer Graphics Lab. N.Y.I.T., Feb. 18, 1983, pp.: 1–29.

Heckbert, P., Fundamentals of Textured Mapping and Image Warping. Master Thesis. Pages: 86. Dated: Jun. 17, 1989.

Rebiai,M., Mansouri,S., Pinson,F., and Tichit, B., "Image Distortion From Zoom Lenses: Modeling and Digital Correction". International Broadcasting Convention. IEEE. Dated: Jul. 1992.

Charles Jeffery, R., "All–Sky Reflector with "Invisible" Camera Support". Images from 1988 RTMC Proceedings. pp.: 79–80.

Roger W. Sinnott, "Scientific Library Gleaning for ATMs". Sky & Telescope. Aug. 1986. Pages: 186.

Charles et al., "How to Build and Use and All–Sky Camera." Astronomy. Apr. 1987. pp.: 64–70.

Johnson, Colin R., "Imaging System Sees All". Electronic Engineering Times. Dec. 25, 1996. pp.: 1&98.

Castleman, K., "Digital Image Processing". Prentice Hall. 1979. pp.: 110–135, 383–400,408.

Castleman, K., "Digital Image Processing". Prentice Hall. 1996. pp.: 125–127, 140–141.

Shah, S., A Simple Calibration Procedure For Fish–Eye (High Distortion) Lens. IEEE. 1994. pp.: 3422–3427.

"Gnomonic Projection". Map Projections–A Working Manual. pp.: 164–168.

Greene, N., and Heckbert, P., "Creating Raster Omnimax Images From Multiple Perspective Views Using The Elliptical Weighted Average Filter". IEEE. 1986. pp.: 21–27.

Fant, K., "A Nonaliasing, Real–Time Spatial Formation Technique". IEEE. 1986. pp.: 71–80.

Greene, William B., "Qualitative Image Processing Techniques". Digital Image Processing, A Systems Approach. $2^{nd}$ Edition. 1989. Van Nostrand Reinhold. pp.: 92–112.

Wolberg, George. Digital Image Warping (Introduction). 1990. IEEE Computer Society Press. Pages: 2.

Fu, K.S. et al., "Low–Level Vision". Robotics: Control, Sensing, Vision, and Intelligence. 1987. McGraw Hill Inc., pp.: 313–315.

Carlbom, Ingrid et al. "Planner Geometric Projections and Viewing Transformations". Computing Surveys. vol. 10, No. 04. Dec. 1978. pp.: 465–502.

Anderson, R.L., et al., "Omnidirectional Real time Imaging Using Digital Restoration". High Speed Photography SPIE. vol. 348. San Diego, CA. 1982. pp.: 807–814.

Laikin, Milton. "Wide Angle Lens System". 1980. International Design Conference (OSA). SPIE. vol. 237. 1980. pp.: 530–532, 815–816.

Shah, Shisir et al., "Depth Estimation using Fish–Eye Lenses". IEEE. Department Of Electrical and Computer Engineering. University of Texas. 1994. pp.: 740–744.

Tsai, Roger Y., "A Versatile Camera Calibration Technique for High Accuracy 3–D Machine Vision Using Off–the–Shelf TV Cameras and Lenses". IEEE. Journal of Robotics and Automation. vol. RA–3. No. 04. Aug. 1987. pp.: 323–344.

Chang, Yuh–Lin et al., "Calibrating a Mobile Camera's Parameters". Pattern Recognition. vol. 26. No. 01. Dated: 1983. pp.: 75–88.

Weng, Juyang. "Camera Calibration With Distortion Models and Accuracy". IEEE. Transactions On Pattern Analysis and Machine Intelligence. vol. 14. No. 10. Oct. 1992. pp.: 965–980.

Lenz, Reimer K. et al., "Techniques for Calibration of the Scale Factor and Image Center for High Accuracy 3–D Machine Vision Metrology". IEEE. Transaction on Pattern Analysis and Machine Intelligence. vol. 05. No. 05. Sep. 1988. pp.: 713–720.

Nomura, Yoshihiko, et al., "A Simple Calibration Algorithm for High–Distortion Lens Camera". IEEE. Transaction on Pattern Analysis and Intelligence Machine. vol. 14. No. 11. Nov. 1992. pp.: 1095–1099.

International Broadcasting Convention Venue RAI Congress And Exhibition Centre, Amersterdam, The Netherlands. Jul. 3–7, 1992. Pages:06, Including the title page.

Miyamoto, K., "Fish Eye Lens". JOSA. vol. 54. pp.: 1060–1061. Dated: Aug. 1964.

Defendant's IPI's Composite Exhibit List, Civil Action of Interactive Pictures Corporation, F/K/A Omniview, Inc. v. Infinite Pictures, Inc. and Bill Tillman. Case No. 3–96–849. Filed: Jan. 5, 1998 in U.S.D.C., Eastern District Of Tennessee. Pages: 20.

Baltes, M. "Beet D'Intervention". Ref. No.: N 1.234.341.

Verity, John W. (edited by): Information Processing. Business Week. p.: 134E. Dated: Jul. 13, 1992.

Marbach, William D. (edited by): Developments To Watch. Business Week. p.: 83. Dated: Sep. 26, 1988.

Lu Carnevale, Mary. Video Camera Puts The Viewer in Control. Wall Street Journal. Dated: Nov. 25, 1992.

Popular Science. Electronic Panning Camera System. pp.: 36–37. Dated: Sep. 1992.

Tulloch, Martha. "New Video Camera . . . " Photonics Spectra. pp.: 18–20. Dated: Oct. 1992.

Fisher, Timothy E., A Programmable Video Image Remapper. SPIE> vol. 938. pp.: 122–128. Dated: 1988.

Lippman, Andrew. Movie–Map: An Application Of The Optical Videodisc To Computer Graphics. Pages: 43. Dated: 1980.

Yelick, Steven. Anamorphic Image Processing. pp.: 1–37, Including Acknowledgement Page. Dated: 1980.

\* cited by examiner

PANORAMIC IMAGING ARRANGEMENT

This patent application is a continuation-in-part of U.S. patent application Ser. No. 08/872,525 filed Jun. 11, 1997 (pending) which claims priority from U.S. Provisional Patent Application Serial No. 60/020,292 filed Jun. 24, 1996.

BACKGROUND OF THE INVENTION

1). Field of the Invention

This invention relates to a panoramic imaging arrangement of the kind capable of capturing, focusing, correcting aberrations and otherwise manipulating light received from a 360° surrounding panoramic scene, and to a method of capturing a 360° surrounding panoramic scene.

2). Discussion of Related Art

Panoramic imaging arrangements have become popular in recent years for purposes of viewing 360° surrounding panoramic scenes. Older generations of panoramic imaging arrangements generally consisted of revolving periscope-like constructions having relatively complex mechanisms for revolving them. More recently, stationary panoramic imaging arrangements have been developed. A stationary panoramic imaging arrangement generally has one or more lenses, each having a vertically extending axis of revolution, which are used to refract or reflect light received from a 360° surrounding panoramic scene. The lenses alter the direction of the light, whereafter the light passes through a series of lenses which are located vertically one above the other and which further manipulate the light by, for example, focusing the light or altering the intensity of the light.

The task of receiving light in a sideways direction and altering the direction of the light so that the light then proceeds in a vertical direction is a difficult one. Altering the direction of light to such a degree, especially when coming from a 360° surrounding scene, oftentimes leads to aberrations in the resulting light. These aberrations may include astigmatism of the light, defects in color of the light, a loss of image plane flatness, and other defects, some of which are discussed in more detail herein below.

Relatively complex lenses and lens arrangements have been developed in order to overcome these aberrations. Some of these lenses have surfaces which are aspherical (see for example U.S. Pat. No. 5,473,474 issued to Powell). Aspherical lenses are difficult to manufacture and therefore less practical to manufacture than for example spherical lenses.

One reason why aberrations in light occur is due to the use of refractive lenses instead of reflective lenses. The use of refractive lenses results in aberrations in color of the resulting light, whereas the use of reflective, or mirror lenses does not result in, or cause minimal aberrations in color of the light reflected from them. One reason for the lack of the use of reflective lenses, on the other hand, is that reflective lenses, when exposed to the environment, degrade through time, resulting in loss of image.

These and other aberrations in light are more prominent when light is received from a panoramic view at a relatively large lateral included angle, particularly if the included angle, in a vertical plane, is larger than 90° and especially if the included angle extends from an angle below the horizon to an angle above the horizon, i.e. covering substantially more than a hemisphere.

SUMMARY OF THE INVENTION

According to one aspect the invention, a panoramic imaging arrangement is provided comprising at least a first lens block including a convex reflective surface and a transparent lens. The convex reflective surface has a substantially vertical axis of revolution and is capable of receiving light from a 360° surrounding panoramic scene, and reflecting the light for further manipulation. The transparent lens has a convex outer surface and covers the convex reflective surface. The convex reflective surface is thereby protected from environmental conditions which may otherwise result in damage to the convex reflective surface. An additional advantage is that a convex cover introduces fewer aberrations and internal reflections.

The convex reflective surface may, for ease of fabrication, be substantially spherical.

The transparent component may, for ease of fabrication, have a spherical outer surface thorough which light from the panoramic scene passes before reaching the convex reflective surface.

The panoramic imaging arrangement may include a second lens block secured to the first lens block. Light, reflected by the convex reflective surface, may pass through the transparent component, whereafter the light may pass through the second lens block. The second lens block provides a way for the first lens block to be held without obscuring its field of view.

The convex reflective surface is preferably capable of receiving light for an unbroken included angle of at least 60° in a vertical plane, from the panoramic scene, and reflecting the light so as to pass through the second lens block.

The included angle preferably extends from an angle below the horizon to an angle above the horizon. The panoramic imaging arrangement is therefore capable of capturing more than just a hemispherical scene. The angle below the horizon is preferably at least 30° below the horizon and the angle above the horizon is preferably at least 30° above the horizon.

A transparent optical cement may be located between the first and second lens blocks and secure the first and second lens blocks to one another.

According to another aspect of the invention, a panoramic imaging arrangement is provided which includes at least a first lens block including a convex reflective surface and a transparent component. The convex reflective surface has a substantially vertical axis of revolution. The convex reflective surface is capable of receiving light from a 360° surrounding panoramic scene for an unbroken included angle, in a vertical plane extending from an angle below the horizon to an angle above the horizon. The convex reflective surface is capable of reflecting the light for further manipulation. The transparent component covers the reflective surface.

According to a further aspect of the invention, a panoramic imaging arrangement is provided comprising at least one lens having a substantially vertical axis of revolution and a convex spherical reflective surface capable of receiving light from a 360° surrounding panoramic scene and reflecting the light received from the panoramic scene. Reflective surfaces cause less aberrations in color, convex reflective lenses require less power, and spherical lenses are easier to manufacture.

Apparatus is preferably provided which is positioned to receive light reflected by the convex spherical reflective surface and is capable of correcting at least one aberration of the light.

The apparatus preferably manipulates the light so as to correct astigmatism, so as to do color correction, to focus the light, to adjust f-theta closer to a desired level, or so as to create a flat image plane when the light is focused.

The convex spherical reflective surface is preferably capable of receiving light for an unbroken included angle of at least 60°, in a vertical plane, whereafter the light from the entire included angle is received by the manipulation apparatus.

The included angle preferably extends from an angle below the horizon to an angle above the horizon.

According to a further aspect of the invention, a panoramic imaging arrangement is provided comprising at least one lens, and light manipulation apparatus. The lens has a substantially vertical axis of revolution. The lens is also capable of receiving light from a 360° panoramic scene surrounding the lens for an unbroken included angle of at least 60°, in a vertical plane, extending from an angle below the horizon to an angle above the horizon. The lens is further capable of altering the direction of the light received from the panoramic scene. The light manipulation apparatus is positioned and capable of receiving light from the lens for the entire included angle. One advantage of such a lens is that a relatively large included angle, extending from below to above the horizon, can be viewed.

The lens preferably has a spherical surface altering the direction of the light.

The lens may have a reflective surface which reflects the light. The reflective surface may be convex and is preferably spherical.

According to yet a further aspect of the invention, apparatus is provided for capturing a panoramic scene. The apparatus comprises a vertical support structure, lower and upper lens blocks, and a convex reflective surface. The lower lens block is secured to an upper end of the support structure. The upper lens block is secured to the lower lens block in a position above the lower lens block and has a convex outer surface having a substantially vertical axis of revolution. The convex reflective surface is located on the upper lens block. Light from a 360° surrounding panoramic scene is capable of passing through the convex outer surface of the upper lens block into the upper lens block, the light is then reflected off the convex reflective surface, and the light then passes through the upper lens block and then through the lower lens block. In such an apparatus there is little obscuring of the panoramic view by the support structure.

The apparatus for capturing the panoramic scene preferably includes a system of lenses positioned below the lower lens block to receive light after passing through the lower lens block.

According to yet a further aspect of the invention, a method is provided of mounting a panoramic lens arrangement including a first lens block which includes a convex reflective surface having a substantially vertical axis of revolution, and a transparent component covering the reflective surface, and a second lens block located on the first lens block. The method includes the step of securing the second lens block to a support structure in a position so that light from a 360° surrounding panoramic scene passes through the transparent component, whereafter the light is reflected by the convex reflective surface, whereafter the light passes through the second block.

According to yet a further aspect of the invention, a method of capturing a panoramic scene is provided. Light, received from a 360° panoramic scene surrounding a convex spherical reflective surface, is reflected from the convex spherical reflective surface. The light reflected from the convex spherical reflective surface may then be corrected for at least one characteristic of the light, the characteristic being selected from the group consisting of: astigmatism; color; f-theta and image flatness.

The convex spherical reflective surface preferably receives light for an unbroken included angle of at least 60°, in a vertical plane, whereafter the light from the entire included angle is corrected.

The included angle preferably extends from an angle below the horizon to an angle above the horizon.

According to yet a further aspect of the invention another method of capturing a panoramic scene is provided. Light is received from a 360° surrounding panoramic scene for an unbroken included angle of at least 60° extending from an angle below the horizon to an angle above the horizon. The direction of the light received from the panoramic scene is then altered. After the direction of the light is altered, at least one characteristic of the light is corrected, the characteristic being selected from the group consisting of: astigmatism; color; f-theta; and image flatness.

BRIEF DESCRIPTION OF THE DRAWINGS

The invention is further described by way of example with reference to the accompanying drawings wherein.

DESCRIPTION OF PREFERRED EMBODIMENT

Figure 1:
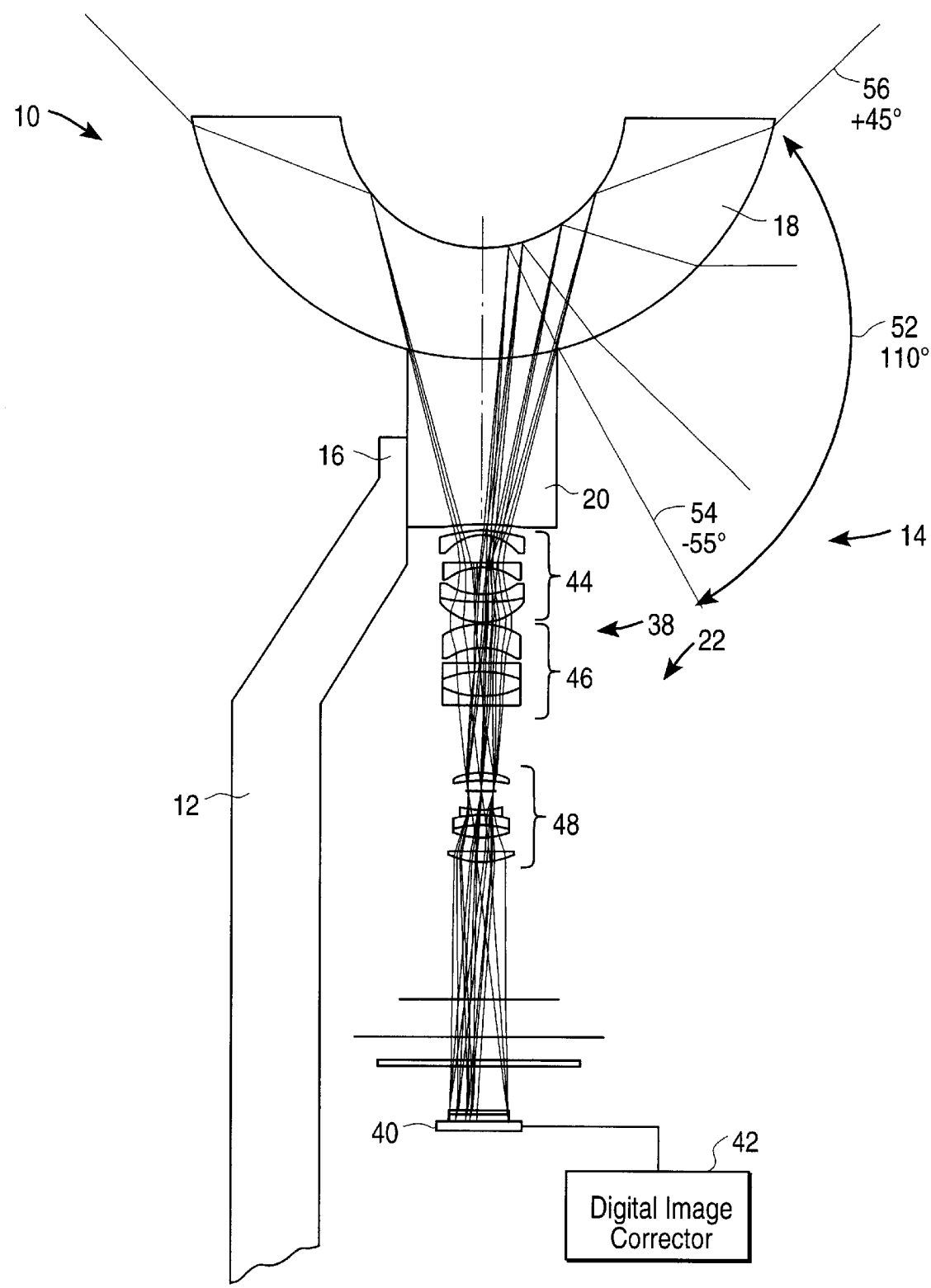
FIG. 1 is a side view illustrating apparatus, according to an embodiment of the invention, for viewing in a panoramic scene.

FIG. 1 of the accompanying drawings illustrates apparatus 10, according to an embodiment of the invention, for capturing a panoramic scene. The apparatus 10 includes a vertically extending support structure 12, and a panoramic imaging arrangement 14 which is secured to an upper end 16 of the support structure 12.

The support structure 12 may be any device having an upper end 16 which is high enough for purposes of providing a viewpoint of a panoramic scene. The support structure 12 may, for example, be a vertically extending post, a tripod stand, or may form part of building structure.

The panoramic imaging arrangement 14 includes a first, upper lens block 18, a second, lower lens block 20, and apparatus 22, positioned below the second lens block 20, for manipulating light so as to correct certain aberrations of the light and to focus the light (hereinafter generally referred to as the "light manipulation apparatus 22").

Figure 2:
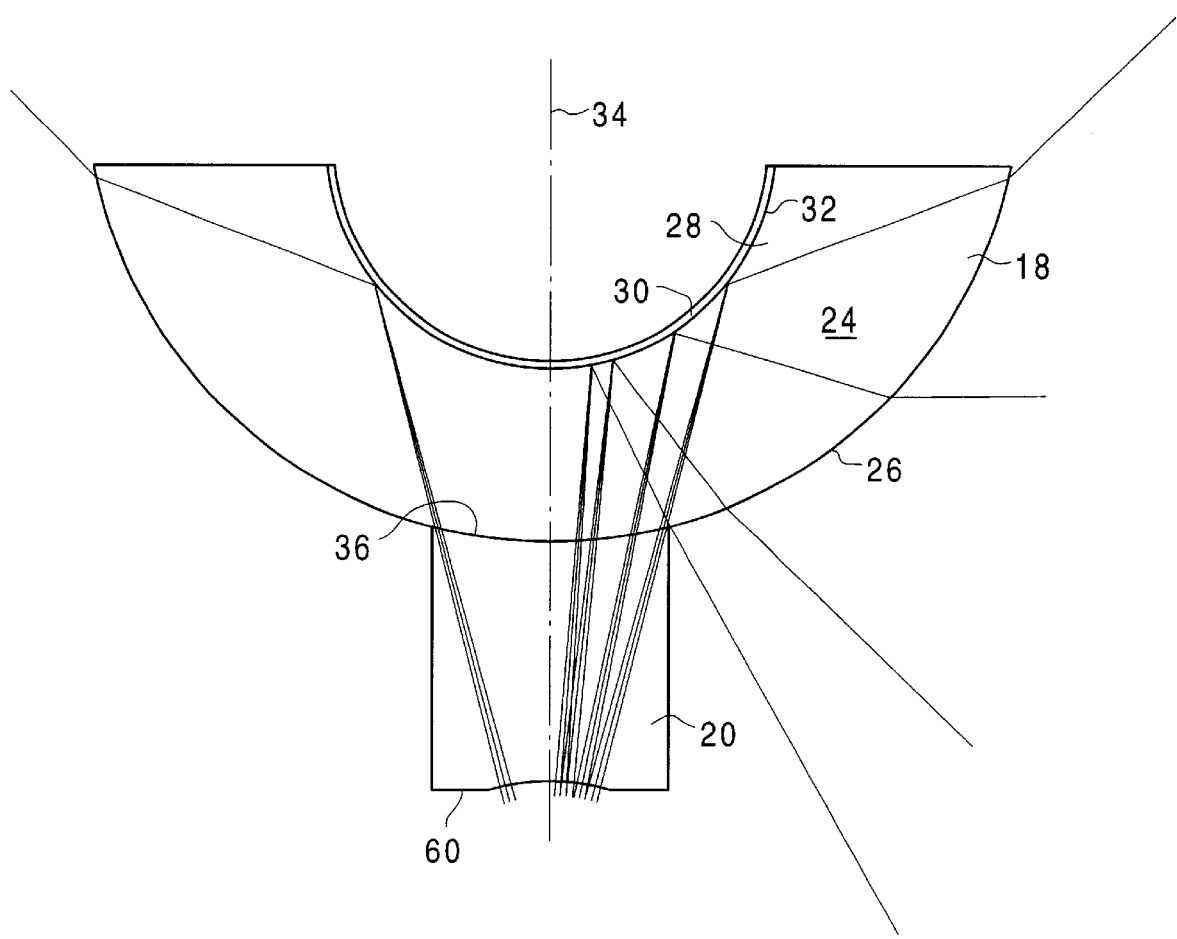
FIG. 2 is an enlarged view of first and second lens blocks forming part of the apparatus of FIG. 1.

FIG. 2 is an enlarged view of the first and second lens blocks 18 and 20.

The first lens block 18 includes a transparent component or refractive lens 24 which has a substantially spherical convex outer and lower surface 26, and a substantially spherical concave inner and upper surface 28. Center points of the convex outer surface 26 and the concave inner surface 28 of the transparent lens 24 substantially coincide with one another.

The concave inner surface 28 is covered with a thin layer of reflective material 30. After the reflective material 30 is deposited, a substantially spherical convex reflective surface 32 (sometimes generally referred to herein as a "convex reflective lens") is provided against the transparent lens 24. The transparent lens 24 so covers the convex reflective surface 32, thereby providing a shield protecting the convex reflective surface 32 against environmental conditions which may otherwise cause damage to the convex reflective surface 32.

The convex outer surface 26 of the transparent lens 24 and the convex reflective surface 32 have a common, substantially vertical axis of revolution 34.

The second lens block 20 is made out of cylindrical transparent material. An upper end 36 of the second lens block 20 has a substantially spherical concave surface which conforms with the convex outer surface 26 of the transparent lens 24.

The transparent lens 24 and the second lens block 20 are secured to one another be means of a transparent optical cement (not shown) which is located between the upper end 36 of the second lens block 20 and the convex outer surface 26 of the transparent lens 24. Transparent optical cements of the above kind are known in the art.

Referring again to FIG. 1, the light manipulation apparatus 22 includes a system of lenses 38, image capturing apparatus 40, and digital image corrector 42.

The system of lenses 38 includes a first set of lenses 44, a second set of lenses 46, and a third set of lenses 48. The lenses work together to correct aberrations of light. Generally speaking the first set of lenses 44 is designed and configured to reduce astigmatism, the second set of lenses 46 for doing color correction, and the third set lenses 48 for creating an image of suitable scale and for fine-tuning certain other system aberration as will further be discussed herein. One skilled in the art of optics will appreciate that the respective sets of lenses 44, 46, and 48 are of conventional kind although their collective effect may be unique in completing the present embodiment. Further details of such lenses may be found in a handbook on modern optics such as in "Modem Optical Engineering" by Warren J. Smith (McGraw Hill, Inc.; 1990).

The panoramic imaging arrangement 14 is secured to the upper end 16 of the support structure 12 by mounting the second lens block 20 directly to the upper end 16 of the support structure 12. No metal or other components are therefore secured to the first lens block 18.

In use, light is received laterally from a 360° panoramic scene surrounding the first lens block 18 (see FIG. 2). Light from the panoramic scene enters the convex outer surface 26 of the transparent lens 24 of the first lens block 18 for an unbroken and continuous included angle 52 located in a vertical plane. The included angle is about 105° covering more than a hemisphere and extends from an angle 54 which is about 55° below the horizon to an angle 56 which about 40° above the horizon. (The included angle 52 is therefore at least 60° and preferably at least 90°, and the angles 54 and 56 below and above the horizon are each therefore at least 30° below and above the horizon.)

It should be noted that the lens blocks 18 and 20 are mounted to the support structure 12 so that light from the panoramic scene is capable of passing over the upper end 16 of the support structure 12, i.e., without the support structure obscuring light from the panoramic scene.

Light from the panoramic scene is refracted slightly upwardly when entering the transparent lens 24. The light then travels through the transparent lens 24 and is reflected downwardly from the convex reflective surface 32. The light then passes downwardly through the transparent lens 24 and exits the transparent lens 24 downwardly through the convex outer surface 26.

The light then passes through the transparent optical cement located between the first and second lens blocks 18 and 20, whereafter the light enters the second lens block 20 through the upper end 36 thereof. The second lens block 20 has a diameter which is sufficiently wide so that light from the entire included angle 52, after being reflected by the convex reflective surface 32, enters the second lens block 20 thorough its upper end 36. The light then travels through the second lens block 20 and exits the second lens block through a lower end 60 thereof. Although not shown in particular detail in the figures, the cylindrical outer surface of the second lens block 20 is typically covered to prevent light from entering into the second lens block 20 in a sideways direction. This may be accomplished with the upper end 16 of the support structure shown in FIG. 2.

Should an attempt be made to focus the light after leaving the second lens block 20, certain aberrations would be noticed. These aberrations include astigmatism, abnormality in color, lack of image plane flatness, and a value of f-theta which is less than 1. The value f-theta is indicative of how much compression of view occurs in a vertical direction of an image view, resulting in more vertical compression in one area of the image view than in another area of the image view. Values of f-theta are expressed as fractions of 1 so that a value of f-theta approaching 1 would be indicative of more uniform compression, and a value of f-theta which is a smaller fraction of 1 would be indicative of more non-uniform compression.

A number of factors, alone and in combination, contribute to these aberrations, including the relatively large width of the included angle 52, the relatively large inclination of the angle 54 below the horizon, the relatively high inclination of the angle 56 above the horizon, and the particular choice of lenses, including the choice of a substantially spherical convex outer surface 26 of the transparent lens 24, and the substantially spherical convex reflective surface 32. These aberrations occur even though a reflective surface 32 is used which causes less aberrations in color than a refractive surface would and even though the transparent lens 24 has a convex outer surface 26 which assist greatly in reducing aberrations.

The light manipulation apparatus 22 (see FIG. 1), however, functions to correct or at least to reduce these aberrations.

In particular, the first set of lenses 44 is positioned so that light from the second lens block 20 passes through the first set of lenses 44. The first set of lenses 44 then generally corrects or at least reduces astigmatism of the light to an acceptable level.

The second set of lenses 46 is positioned to receive the light, after passing through the first set of lenses 44, and generally functions so as to do color correction of the light.

The third set of lenses 48 is positioned to receive light, after passing through the second set of lenses 46, and generally functions to reduce the effect of compression so that the value f-theta is adjusted closer to 1, typically to a value above 0.5. The third set of lenses 48 also functions to flatten the image plane and focus the image on the image capturing apparatus 40.

The image capturing apparatus 40 may, for example, be a digital detection array capable of capturing the image projected by the panoramic imaging arrangement 14. Certain aberrations may still exist, even after the light passes through the system of lenses 38. For example, the value of f-theta, although adjusted to be closer to 1, may still be somewhat below 1.

The digital image corrector 42 is coupled to the image capturing apparatus so as to receive the image captured by the image capturing apparatus 40. The digital image corrector 42 is capable of adjusting the image so as to correct for certain, still existing aberrations. For example, the digital image corrector 42 may adjust f-theta so as to be closer or substantially equal to 1. One skilled in the art would appreciate that the digital image corrector 42 typically has a processor and memory with an executable program which corrects the aberrations in the light referred to.

As mentioned previously, one unique feature is that a substantially spherical convex reflective surface 32 is used which is protected from environmental conditions which may otherwise result in damage to the reflective surface 32. Reflective lenses generally have the advantage that they reflect light with little or no aberrations in color of the reflected light and convex reflective lenses have the added advantage that they require less power than, for example, concave reflective lenses.

It should also be evident from the aforegoing description that another advantage is that the panoramic imaging arrangement 14 can be mounted to the support structure 12 in a manner wherein the support structure 12 does not obscure light from a panoramic view from reaching the first lens block 18.

A further advantage of the invention is that lenses having substantially spherical surfaces are used. Spherical surfaces are easier to manufacture than paraboloidal, hyperboloidal, ellipsoidal or other aspheric surfaces and are therefore less expensive to manufacture.

Yet a further advantage is that a relatively large included angle 52 can be received which extends from a relatively large angle 54 below the horizon to a relatively large angle 56 above the horizon.

Although spherical surfaces are used, at least one of which having a reflective surface, and regardless of the choice of angles 52, 54, and 56, a final image is created which is corrected for astigmatism and color, which is flattened, and in which the value of f-theta is controlled.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. A panoramic imaging arrangement comprising:
    at least a first lens block including:
        a convex reflective surface having a substantially vertical axis of revolution, the convex reflective surface being capable of receiving light from a 360° surrounding panoramic scene and reflecting the light for further manipulation; and
        a transparent refractive lens, having a convex outer surface, covering the convex reflective surface, the convex outer surface and the convex reflective surface bulging along the axis of revolution in substantially the same direction; and
        a manipulation apparatus positioned to receive light reflected by the convex reflective surface and capable of correcting at least one aberration of the light and wherein the manipulation apparatus focuses the light to create an image wherein f-theta is less than 1.

2. The panoramic imaging arrangement of claim 1 wherein the convex reflective surface is substantially spherical.

3. The panoramic imaging arrangement of claim 1 wherein the transparent refractive lens has a spherical outer surface through which the light from the panoramic scene passes before reaching the convex reflective surface.

4. The panoramic imaging arrangement of claim 1 further comprising a second lens block, secured to the first lens block, wherein the light reflected by the convex reflective surface passes through the transparent refractive lens, whereafter the light passes through the second lens block.

5. The panoramic imaging arrangement of claim 4 wherein the second lens block does not obscure light from reaching the first lens block.

6. The panoramic imaging arrangement of claim 4 wherein the convex reflective surface is capable of receiving light for an unbroken included angle of at least 60°, in a vertical plane, from the panoramic scene, and reflecting the light so as to pass through the second lens block.

7. The panoramic imaging arrangement of claim 6 wherein the included angle extends from an angle below the horizon to an angle above the horizon.

8. The panoramic imaging arrangement of claim 7 wherein the angle below the horizon is at least 30° below the horizon.

9. The panoramic imaging arrangement of claim 7 wherein the angle above the horizon is at least 30° above the horizon.

10. The panoramic imaging arrangement of claim 1 wherein the manipulation apparatus corrects astigmatism of the light.

11. The panoramic imaging arrangement of claim 1 wherein the manipulation apparatus does color correction of the light.

12. The panoramic imaging arrangement of claim 1 wherein the manipulation apparatus creates a flattened image plane.

13. The panoramic imaging arrangement of claim 1 wherein f-theta is more than 0.5.

14. The panoramic imaging arrangement of claim 1 further comprising a digital image connector configured to read the image and to adjust f-theta closer to 1.

15. A panoramic imaging arrangement comprising:
    at least a first lens block including;
        a convex reflective surface having a substantially vertical axis of revolution, the convex reflective surface being capable of receiving light from a 360° surrounding panoramic scene and reflecting the light for further manipulation; and
        a transparent refractive lens, having a convex outer surface, covering the convex reflective surface; and
        a second lens block, secured to the first lens block with an optical cement located between the first and second lens blocks, wherein the light reflected by the convex reflective surface passes through the transparent refractive lens, whereafter the light passes through the second lens block.

16. The panoramic imaging arrangement of claim 15 wherein the second lens block does not obscure light from reaching the first lens block.

17. The panoramic imaging arrangement of claim 15 further comprising a manipulation apparatus positioned to receive light reflected by the convex reflective surface and capable of correcting at least one aberration of the light.

18. The panoramic imaging arrangement of claim 17 wherein the manipulation apparatus corrects astigmatism of the light.

19. The panoramic imaging arrangement of claim 17 wherein the manipulation apparatus does color correction of the light.

20. The panoramic imaging arrangement of claim 17 wherein the manipulation apparatus focuses the light.

21. The panoramic imaging arrangement of claim 20 wherein the manipulation apparatus creates a flattened image plane.

22. The panoramic imaging arrangement of claim 20 wherein, after focusing the light, an image is created wherein f-theta is less than 1.

23. The panoramic imaging arrangement of claim 22 wherein f-theta is more than 0.5.

24. The panoramic imaging arrangement of claim 22 further comprising a digital image connector configured to read the image and to adjust f-theta closer to 1.

* * * * *